(12) United States Patent
Solntsev et al.

(10) Patent No.: US 8,292,222 B2
(45) Date of Patent: Oct. 23, 2012

(54) AIR-CONDITIONING SYSTEM WITH ICING PROTECTION FOR AN AIRCRAFT

(75) Inventors: Alexander Solntsev, Hamburg (DE); Johannes Eichholz, Hamburg (DE); Holger Bammann, Buxtehude (DE)

(73) Assignee: Airbus Deutschland GmbH, Hamburg (DE)

(*) Notice: Subject to any disclaimer, the term of this patent is extended or adjusted under 35 U.S.C. 154(b) by 810 days.

(21) Appl. No.: 12/322,999

(22) Filed: Feb. 10, 2009

(65) Prior Publication Data

US 2009/0217681 A1  Sep. 3, 2009

Related U.S. Application Data

(63) Continuation of application No. PCT/EP2007/006896, filed on Aug. 3, 2007.

(30) Foreign Application Priority Data

Aug. 10, 2006 (DE) .......................... 10 2006 037 539

(51) Int. Cl.
*B64D 13/08* (2006.01)

(52) U.S. Cl. ..................... 244/118.5; 236/1 B; 165/235; 62/186

(58) Field of Classification Search ............... 244/118.5, 244/134 R; 236/1 B, 12.1, 13, 49.3; 62/186, 82/50, 51, 52, 901, 92; 165/235
See application file for complete search history.

(56) References Cited

U.S. PATENT DOCUMENTS

| 4,445,342 A | 5/1984 | Warner |
| 4,684,081 A | 8/1987 | Cronin |
| 5,299,763 A * | 4/1994 | Bescoby et al. ........... 244/118.5 |
| 5,516,330 A * | 5/1996 | Dechow et al. ................. 454/74 |

(Continued)

FOREIGN PATENT DOCUMENTS

CA 2 350 978 A1 1/2002

(Continued)

OTHER PUBLICATIONS

English language abstract for DE 199 36 643 A1.

(Continued)

*Primary Examiner* — Benjamin P Lee
(74) *Attorney, Agent, or Firm* — Krieg DeVault, LLP

(57) ABSTRACT

Aircraft air-conditioning system (1) for an aircraft having a plurality of zones (2, 4), comprising a first line (6) for feeding cold air at an actual temperature $T1_{act.}$, a second line (14) which branches off a portion of the air from the first line (6) at a branching point (10) and feeds the air to a plurality of zones (2, 4) of an aircraft, wherein warm air is fed through a first trim valve (12) into the second line (14) so that the air in the second line (14) is heated to the actual temperature $T2_{act.}$, and a first zone feed line (24) feeding the air downstream of the first trim valve (12) to a first zone (2), wherein a second trim valve (26) is arranged in the first zone feed line (24), through which valve warm air is fed into the first zone feed line (24) so that the air in the first zone feed line (24) is heated to the actual temperature $Tzf1_{act.}$, and the first line (6) downstream and/or upstream of the branching point (1) feeds cold air at least to one further zone. A second feed line (18) feeds air downstream of the first adjustment (12) to a second zone (4). A heating device (20) can be arranged in the second feed line (18).

20 Claims, 2 Drawing Sheets

U.S. PATENT DOCUMENTS

| | | | |
|---|---|---|---|
| 5,545,084 A | | 8/1996 | Fischer et al. |
| 5,791,982 A | * | 8/1998 | Curry et al. ............... 454/74 |
| 5,934,083 A | * | 8/1999 | Scherer et al. ............ 62/79 |
| 6,401,473 B1 | | 6/2002 | Ng et al. |
| 6,449,963 B1 | * | 9/2002 | Ng et al. ............... 62/86 |
| 6,619,589 B2 | * | 9/2003 | Brasseur et al. ........... 244/118.5 |
| 7,727,057 B2 | * | 6/2010 | Beier et al. ............... 454/76 |
| 8,074,927 B2 | * | 12/2011 | Markwart ............... 244/118.5 |
| 2005/0061913 A1 | | 3/2005 | McColgan et al. |
| 2007/0120014 A1 | * | 5/2007 | Elmers et al. ........... 244/118.5 |
| 2008/0217476 A1 | * | 9/2008 | Barbara et al. ........... 244/118.5 |
| 2009/0301110 A1 | * | 12/2009 | Klimpel ............... 62/89 |

FOREIGN PATENT DOCUMENTS

| | | |
|---|---|---|
| DE | 1 105 731 | 4/1961 |
| DE | 1105731 B | 4/1961 |
| DE | 33 30 556 A1 | 3/1984 |
| DE | 199 36 643 A1 | 2/2001 |
| DE | 103 61 709 A1 | 8/2005 |
| EP | 1 407 966 A1 | 4/2004 |
| FR | 2 485 473 | 6/1980 |
| RU | 2170192 C1 | 7/2001 |
| RU | 2220885 C1 | 1/2004 |
| WO | WO 2005/063575 | 7/2005 |
| WO | WO 2005/063575 A1 | 7/2005 |
| WO | WO2006/079507 A1 | 8/2006 |
| WO | WO 2008/017427 | 2/2008 |

OTHER PUBLICATIONS

International Search Report, PCT/EP2007/006896, Airbus Deutschland GmbH, The International Searching Authority/European Patent Office, Dec. 4, 2007, 3 pgs.

Written Opinion of the Intl. Searching Authority, PCT/EP2007/006896, Airbus Deutschland GmbH, The Intl. Searching Authority/European Patent Office, Feb. 10, 2009, 5 pgs.

Decision on Granting from the Russian Federal Service for Intellectual Property Patents and Trademarks, Application No. 2009103768/11(004929), Dec. 13, 2011.

English language translation of Decision on Granting from the Russian Federal Service for Intellectual Property Patents and Trademarks, Application No. 2009103768/11(004929), Dec. 13, 2011.

* cited by examiner

AIR-CONDITIONING SYSTEM WITH ICING PROTECTION FOR AN AIRCRAFT

CROSS REFERENCE TO RELATED APPLICATIONS

The present application is a continuation of PCT/EP2007/0068996 filed Aug. 3, 2007 which claims priority to German Patent Application No. 10 2006 037 539.4, filed Aug. 10, 2006, each of which is incorporated herein by reference.

The present invention relates to an icing protected air-conditioning system for the air conditioning of a plurality of zones of an aircraft.

In an aircraft, in particular a freight aircraft, an air stream with cold treated air is tapped an is tempered in order to supply a plurality of zones, for example a freight compartment, a section of an aircraft cabin and/or a cockpit, with suitably tempered air. Each zone requires an individual feed air temperature in order to reach the set temperature in the zone.

Figure 2:
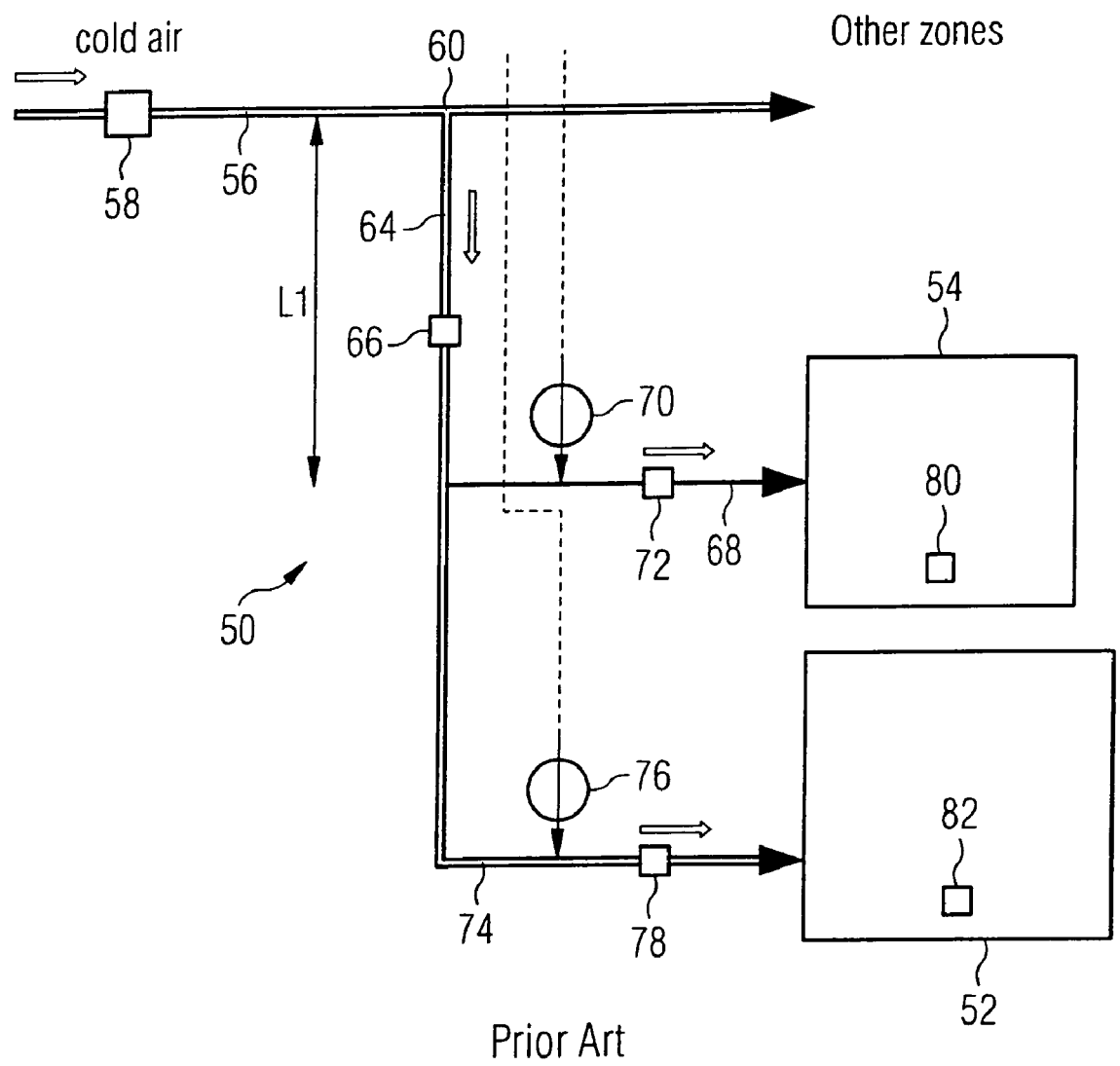

FIG. 2 shows a conventional aircraft air-conditioning system 50 for the air conditioning of a first zone 52 and a second zone 54. Cold air is supplied via a first line 56, and is tapped at a tapping point 60 into a second line 64. Air is led from the second line 64 into the first zone 52 via a first zone feed line 74. Air is fed from the second line 64 to the second zone 54 via a second zone feed line 68. A first zone feed line trim valve 76 adds warm air to the air in the first zone feed line 74, so that the air flowing into the first zone 52 has the desired temperature. A second zone feed line trim valve 70 adds warm air to the second zone feed line 68 so that the air flowing into the second zone 54 has the desired temperature. Sensors 58, 66, 72, 78, 80 and 82 sense the respective actual temperatures and a regulating device (not shown) controls the first zone feed line trim valve 76 and the second zone feed line trim valve 70 so that the first zone 52 and the second zone 54 are at the desired set temperatures.

The temperature of the cold air in the first line 56 is always less than or equal to the lower temperature of the respective temperatures of the air flowing into the first zone 52 and into the second zone 54, respectively. In order to reach the necessary set temperature of the air flowing into the first zone 52 and of the air flowing into the second zone 54, as mentioned before, appropriate amounts of warm air are added by means of a first zone feed line trim valve 76 and a second zone feed line trim valve 70 to the first zone feed line 74 and to the second zone feed line 68, respectively. Often the zones to be tempered are of different size, for example the second zone 54 is smaller, and is often even significantly smaller, than the first zone 52. If, as is known from the prior art, the first zone feed line trim valve 76 and the second zone feed line trim valve 70 are to be structurally identical, then both valves 70 and 76 must be dimensioned for the largest zone to be tempered. This may result in that the trim valve for a small zone is over-dimensioned in such a way that small amounts of trim air cannot be admixed sufficiently accurately.

In this aircraft air-conditioning system of the prior art there occurs also the problem that the cold and moist air which is fed from the first line can lead to an icing in a line upstream of the zone feed line trim valves. In particular a branching point 60 or a sharp bend in the line layout is subject to icing. Also, two warm air feed lines are necessary for the first zone feed line trim valve 76 and the second zone feed line trim valve 70, both of which have to bridge the section L1, which can lead to installation problems and can increase the weight of the system.

DE 103 61 709 A1 describes a method for regulating the temperature in zones of an aircraft, wherein the method includes measuring the respective actual temperatures as well as the respective set temperatures in the individual zones, and tapped air from the engine as well as cooler air are mixed in order to obtain a pre-tempered mixed air at a temperature which corresponds substantially to the lowest of the sensed desired temperatures. The pre-tempered mixed air is distributed to all regions. The mixed air distributed to the regions of higher set temperature is post-tempered corresponding to the differences between the respective set temperatures and the respective actual temperatures. The post-tempering can be carried out by means of heating devices, for example electrical heating devices.

FR 2 485 473 discloses an aircraft air-conditioning system for the air conditioning of an aircraft containing a plurality of zones. Warm air is cooled, and then warm air is again added to the cooled air. Thereby a temperature is obtained that corresponds to the lowest set temperature of the air fed to the zones. In each of the feed lines to the zones warm air can be added to the zones in order to reach the desired set temperature of the air to be fed to the respective zone.

An object of the present invention is to avoid the icing of a line of an aircraft air-conditioning system.

According to the invention this object is achieved by an aircraft air-conditioning system for an aircraft having a plurality of zones, wherein the aircraft air-conditioning system includes a first line for feeding cold air at the actual temperature $T1_{act.}$ and a second line which branches off a portion of the air from the first line at a branching point and feeds this air to a plurality of zones of an aircraft. Warm air is added by means of a first trim valve to the second line, so that the air in the second line is heated to the actual temperature $T2_{act.}$. The air in the first line can be heated to an actual temperature $T2_{act.}$ of above approximately 0° C. The first line also supplies cold air to at least one further zone of an aircraft downstream and/or upstream of the branching point. Preferably the first trim valve is located in the vicinity of the branching point, and preferably the distance between the branching point and the trim valve is less than about 1 m, more preferably less than about 0.5 m, still more preferably less than about 0.25 m, and most particularly preferably less than about 0.1 m.

The first line may for example be connected to a common cold air source for a plurality of zones. The cold air source may be a so-called PACK. The temperature of the cold air in the first line may vary for example between about −25° C. and about +45° C., the temperature of the cold air being +45° C. only if a particularly rapid heating of a zone is desired. Preferably the temperature of the cold air in the first line is between about 0° C. and −25° C., and most preferably is between about −10° C. and 0° C. Accordingly the cold air in the first line can be used for the air conditioning of zones in which passengers and/or crew members are accommodated, and of zones in which for example perishable goods are transported and which have to be suitably supplied with cold air. As has already been mentioned, the first line supplies these zones downstream and/or upstream of the branching point with cold air. The temperature of the air flowing through the first trim valve may be between about 150° C. and about 200° C. The air flowing through the first trim valve can heat up the air in the second line to more than about 0° C.

The aircraft air-conditioning system can furthermore include a first zone feed line, which feeds the air downstream of the first trim valve to a first zone. The air in the second feed line can be fed downstream of the first trim valve to a plurality of zones. In the first zone feed line a second trim valve is arranged, through which warm air is fed to the first zone feed line so that the air in the said first zone feed line is heated to the actual temperature $Tzf1_{act.}$. The air flowing through the second trim valve is at a temperature between about 150° C. and about 200° C.

This aircraft air-conditioning system has the advantage that the air in the second line is heated early, whereby an icing of the second line and/or of the zone feed lines connected thereto can be avoided. Since the second line and the zone feed lines have many bends, so that they can be adapted to the given spatial conditions, they are particularly susceptible to icing. As mentioned previously, the cold air from the first line is also fed to other zones, which for example have a lower set temperature than the first and second zones. For example, it might be necessary to cool the freight compartment of an aircraft so that fresh goods transported therein do not perish. If the first trim valve were arranged in the first line, warm air would actually also be supplied to zones of an aircraft that actually need to be cooled, as a result of which a separate energy-intensive cooling device, which increases the overall weight, would be necessary in the corresponding zone to be cooled. Furthermore, on account of the long length of the first line, the air in the first line could cool down before it reached the zone to be air-conditioned. If the first trim valve were arranged in the first line, then on account of the long length of the first line a long dead time would result, which can lead to a sluggish and/or unstable control loop for regulating the temperature of the air flowing into the zones.

The aircraft air-conditioning system can include a second zone feed line that feeds air downstream of the first trim valve to a second zone. A heating device, for example an electrical heating device, can be arranged in the second zone feed line, which heats the air in the second zone feed line to the actual temperature $Tzf2_{act.}$. The second zone may require a smaller amount of warm air than the first zone. Preferably about three times, more preferably about five times, and most preferably about 10 times the amount of air is fed to the first zone as is fed to the second zone. A separate heating device is preferred for the second zone, since this can be controlled more accurately given the smaller amount of air required for the second zone.

The first zone and the second zone form a group of zones that are supplied via the second line. The first line can also supply further groups of zones or further individual zones with cold air.

The aircraft air-conditioning system according to the invention can advantageously be used in an aircraft in which the first zone is substantially larger than the second zone. In this case the first trim valve and the second trim valve may be of the same type, which on account of the need for storing fewer different types of trim valves leads to a reduction in the expenditure involved in the manufacture and maintenance of the aircraft. A reduced variety of component parts is also advantageous having regard to the necessary certification and registration procedure in the aviation industry. Since the first zone is supplied with warm air by two cascade-arranged trim valves, trim valves of smaller dimensions can be employed.

The aircraft air-conditioning system can include a first temperature sensor for measuring the actual temperature $T1_{act.}$ of the air in the first line. The aircraft air-conditioning system can in addition include a second temperature sensor that senses the actual temperature $T2_{act.}$ of the air in the second line downstream of the first trim valve, and a regulating device, which is designed to control the first trim valve and the second trim valve. The regulating device can control the first trim valve in such a way that the actual temperature $T2_{act.}$ of the air in the second line corresponds approximately to the set temperature $Tzf2_{set}$ of the air in the second zone feed line.

The aircraft air-conditioning system can furthermore include a first zone feed line temperature sensor, which senses the actual temperature $Tzf1_{act.}$ of the air in the first zone feed line downstream of the trim valve, and a second zone feed line temperature sensor, which senses the actual temperature $Tzf2_{act.}$ of the air in the second zone feed line downstream of the heating device. The regulating device can, if the set temperature $Tzf1_{set}$ of the air in the first zone feed line is higher than the set temperature $Tzf2_{set}$ of the air in the second zone feed line, control the first trim valve in such a way that the actual temperature $T2_{act.}$ of the air in the second line corresponds approximately to the set temperature $Tzf2_{set}$ of the air in the second zone feed line. Therefore the heating device has to consume no, or only relatively little energy, in order to bring the temperature in the second zone to the set temperature. The second trim valve is in this case open, in order to heat the air in the first zone feed line to the set temperature $Tzf1_{set}$.

The regulating device can, if the set temperature $Tzf1_{set}$ of the air in the first zone feed line is lower than the set temperature $Tzf2_{set}$ of the air in the second zone feed line, control the first trim valve in such a way that the actual temperature $T2_{act.}$ of the air in the second line corresponds approximately to the set temperature $Tzf1_{set}$ of the air in the first zone feed line. The second trim valve remains in this case completely closed. The heating device heats the air flowing into the second zone to the set temperature $Tzf2_{set}$.

The regulating device can, if the set temperature $Tzf1_{set}$ of the air in the first zone feed line is lower than the set temperature $Tzf2_{set}$ of the air in the second zone feed line, control the first trim valve in such a way that the actual temperature $T2_{act.}$ of the air in the second line is increased, and can control the second trim valve in such a way that the air in the first zone feed line is heated to the set temperature $Tzf1_{set}$. This control is necessary if the warm air fed via the first trim valve is not sufficient to increase the actual temperature $T2_{act.}$ of the air in the second line to the set temperature $Tzf1_{set}$ of the air in the first zone feed line. The heating device heats the air flowing into the second zone to the set temperature $Tzf2_{set}$. The heating device can be dimensioned relatively small since it receives air that has already been preheated.

The regulating device can, if the set temperature $Tzf1_{set}$ of the air in the first zone feed line is higher than the set temperature $Tzf2_{set}$ of the air in the second zone feed line, control the first trim valve in such a way that the actual temperature $T2_{act.}$ of the air in the second line is increased, and can control the heating device in such a way that the heating device heats the air in the second zone feed line to the set temperature $Tzf2_{set}$. This control is necessary if the warm air fed via the first trim valve to the second line is not sufficient to increase the actual temperature $T2_{act.}$ of the air in the second line to the set temperature $Tzf2_{set}$ of the air in the second zone feed line. The second trim valve is opened, in order to heat the air in the first zone feed line to the set temperature $Tzf1_{set}$.

The aircraft air-conditioning system can include a first zone temperature sensor, which senses the actual temperature $Tz1_{act.}$ of the air in the first zone, wherein the regulating device determines the set temperature $Tzf1_{set}$ of the air in the first zone feed line from the actual temperature $Tz1_{act.}$ and the set temperature $Tz1_{set}$ of the air in the first zone. The aircraft air-conditioning system can furthermore include a second zone temperature sensor, which senses the actual temperature $Tz2_{act.}$ of the air in the second zone, wherein the regulating device determines the set temperature $Tzf2_{set}$ of the air in the second feed line from the actual temperature $Tz2_{act.}$ and the set temperature $Tz2_{set}$ of the air in the second zone.

The invention also relates to a method for the air conditioning of a plurality of zones in an aircraft, which feeds non-recirculated cold air at the actual temperature $T1_{act.}$ in a first line and branches off part of the cold air at a branching point into a second line. The cold air in the first line is passed on to further zones, which are located downstream and/or upstream of the branching point. Warm air is fed to the second line via a first trim valve, so that the air in the second line is heated to the actual temperature $T2_{act.}$. The air in the second line can be heated to an actual temperature $T2_{act.}$ of more than about 0° C. Part of the air in the second line is lead through a first zone feed line into a first zone and warm air is fed through a second trim valve into the first zone feed line, so that the air in the first zone feed line is heated to the actual temperature $Tzf1_{act.}$. The method can also include the step of passing some of the air in the second line through a second zone feed line into a second zone and heating the air in the second feed line to the actual temperature $Tzf2_{act.}$ with a heating device.

Figure 1:
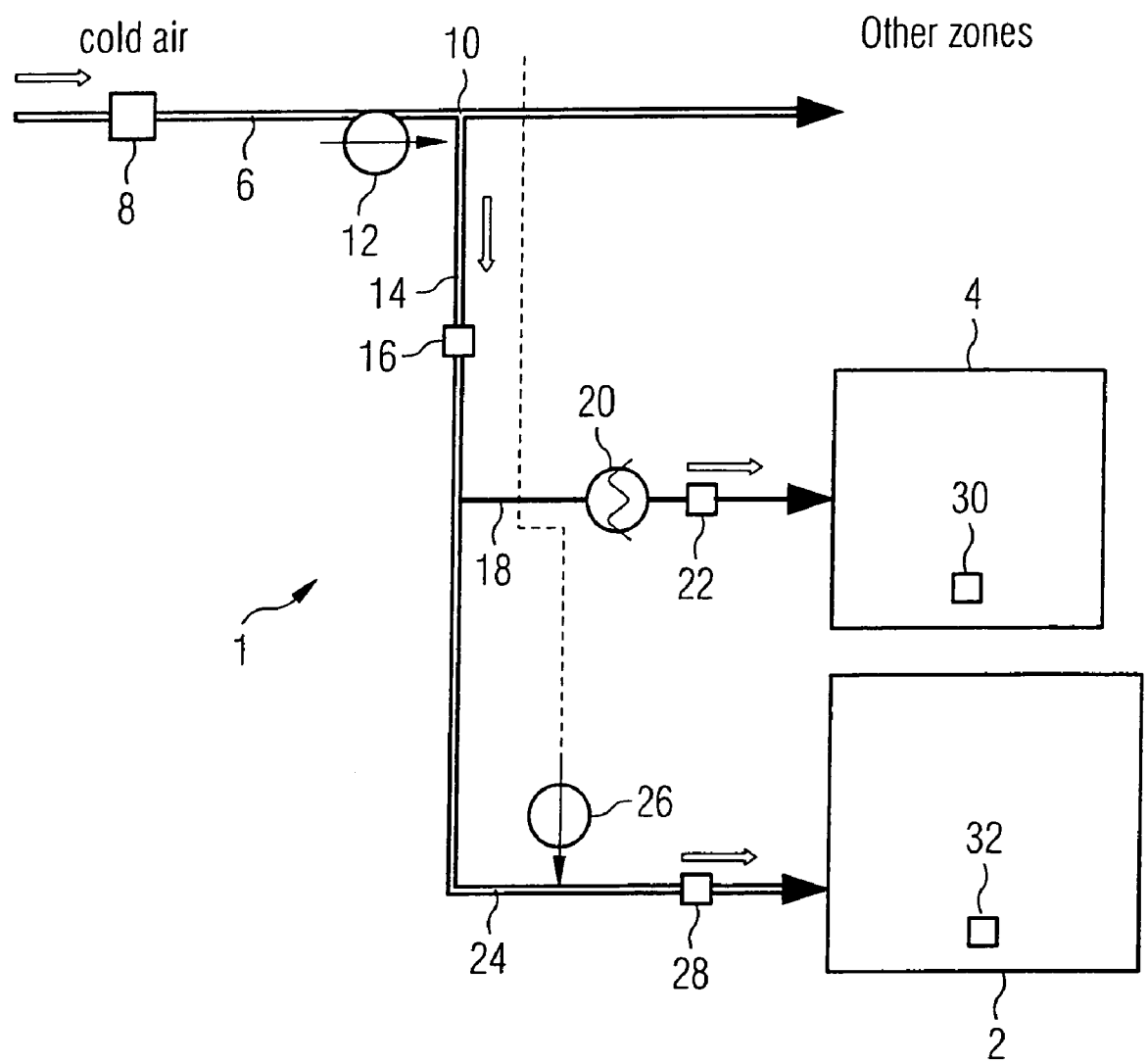

The invention is now described in more detail with reference to the accompanying drawings, in which:

FIG. 1 shows an aircraft air-conditioning system according to the invention for the air conditioning of a plurality of zones in an aircraft, and FIG. 2 shows an aircraft air-conditioning system of the prior art for the air conditioning of a plurality of zones in an aircraft.

FIG. 1 shows a first zone 2 and a second zone 4 of an aircraft. In a freight-carrying aircraft the first zone 2 can for example be the cockpit and the rest area for the crew, and the second zone 4 can for example be the compartment for the freight officer. Cold air at a temperature $T1_{act.}$, which is sensed with a sensor 8, is provided via a first line 6 to the zones of an aircraft. At a branching point 10 air is branched off into a second line 14. The remainder of the air can be fed to further zones or groups of zones, which have a different or the same set zone temperature as the first zone 2 and the second zone 4. For example, the further zones or groups of zones may be freight compartments that have to be cooled, and which transport perishable goods. The further zones or groups of zones may be located upstream or downstream of the branching point.

The first line 6 may for example be connected to a common cold air source for a plurality of zones. The air flowing in the first line may be non-recirculated air. The cold air source can be a so-called PACK. The temperature of the cold air in the first line may vary for example between about −25° C. and about +45° C., the value of +45° C. being necessary only if a sustained heating of a zone of the aircraft is desired. Preferably the cold air has a temperature ranging from about −10° C. up to about 0° C. The cold air in the first line 6 can therefore be used for the air conditioning of zones in which passengers and/or crew members are accommodated, and for zones in which for example perishable goods are transported and which accordingly have to be supplied with cold air.

Typically the region of an aircraft cabin in which passengers are accommodated is supplied with recirculated air. For this purpose air which is supplied by the so-called air-conditioning PACKs and which has a temperature of about −10° C., is fed to a mixing chamber. In the mixing chamber the air from the so-called air-conditioning PACKs is mixed with recirculated air from the passenger cabin. The air discharged from the mixing chamber has a temperature of about +5° C. The proportion of recirculated air in the air discharged from the mixing chamber is about 40%. For safety reasons it is undesirable to feed air from the mixing chamber to the cockpit, since this contains recirculated air. In the event of a fire this recirculated air may contain smoke, which in the cockpit can have particularly fatal consequences. The cockpit is supplied directly with cold air from the so-called air-conditioning PACKs, without the air fed to the cockpit having passed through a mixing chamber.

The cold air in the first line 6 can thus supply the cockpit in the first zone 2 and the compartment for the freight officer, forming the second zone, with cold air via the second line 14. In addition, the cold air from the first line 6 can be fed to further zones and/or devices in an aircraft, for example to the mixing chamber for a passenger cabin and the freight compartment, wherein in this case the cold air does not flow through the second line. The tapping of the air for these further zones takes place upstream or downstream of the branching point 10 of the second line 14. The cold air in the first line 6 can thus be provided by the so-called air-conditioning packs.

A first trim valve 12 feeds warm air to the second line 14, so that the air in the second line is heated to the temperature $T2_{act.}$, which is sensed with a second sensor 16. The temperature of the air flowing through the first trim valve may range from about 150° C. up to about 200° C. The actual temperature $T2_{act.}$ of the air in the second line downstream of the first trim valve is more than about 0° C. An icing of the second line is thus effectively prevented. A first zone feed line 24 branches off air from the second line and feeds it to the first zone 2. A second trim valve 26 feeds warm air to the first zone feed line 24, so that this is heated to the temperature $Tzf1_{act.}$, which is sensed by a first zone feed line temperature sensor 28. A first zone temperature sensor 32, which senses the actual temperature $Tz1_{act.}$ of the air in the first zone 2, is located in the second zone. The first zone feed line 24 feeds about 200 to about 250 liters of air per second to the first zone 2.

A second zone feed line 18 feeds part of the air in the second line 14 to the second zone 4, wherein the air flowing into the second zone 4 from the second zone feed line 18 has a temperature $Tzf2_{act.}$, which is sensed with a second zone feed line temperature sensor 22. A second zone temperature sensor 30, which senses the actual temperature $Tz2_{act.}$ of the air in the second zone 4, is located in the second zone 4. The second zone feed line 18 feeds about 40 to about 50 liters of air per second to the second zone 4.

Preferably the first trim valve 12 is located in the immediate proximity of the branching point 10, and preferably the distance between the branching point 10 and the first trim valve 12 is less than 1 m, more preferably is less than 0.5 m, still more preferably is less than 0.25 m, and most particularly preferably is less than 0.1 m.

A regulating device (not shown) controls the first trim valve 12 in such a way that the actual temperature $T2_{act.}$ in the second line 14 corresponds approximately to the set temperature $Tzf2_{set}$ of the air in the second zone feed line. In this way the set temperature $Tz2_{set}$ is established in the second zone 4. Warm air can be fed via the second trim valve 26 to the first zone feed line 24, so that the air flowing into the first zone 2 is heated to the set temperature $Tzf1_{set}$, whereby the set temperature $Tz1_{set}$ is established in the first zone 2. The second zone 4 has a high thermal load, since it contains instruments and equipment that have a high heat output. In this case air flowing into the second zone 4 does not have to be additionally heated.

In a further embodiment the aircraft air-conditioning system 1 can include a heating device 20, for example an electrical heating device. The second zone 4 is smaller than the first zone 2 and therefore requires a smaller amount of added air. The heating device 2 can be regulated manually or automatically.

The aircraft air-conditioning system according to the invention may be employed particularly advantageously in an aircraft in which the first zone 2 is substantially larger than the second zone 4. In this case the first trim valve 14 and the second trim valve 26 may be of the same type, which reduces both the manufacturing and maintenance expenditure on account of the smaller number of parts involved. As previously mentioned, a reduced variety of parts is also advantageous having regard to the certification and registration procedure required in the aviation industry. Since the first zone 2 is supplied with warm air by two trim valves 12, 26 arranged in cascade, trim valve 12, 26 of smaller dimensions can be employed.

If the set temperature $Tzf1_{set}$ of the air in the first zone feed line 24 is higher than the set temperature $Tzf2_{set}$ of the air in the second zone feed line 18, then the regulating device controls the first trim valve 12 in such a way that the actual temperature $T2_{act.}$ of the air in the second line 14 roughly corresponds to the set temperature $Tzf2_{set}$ of the air in the second zone feed line 18. The heating device 20 therefore has to use no, or only a relatively small amount of energy, in order to bring the temperature in the second zone to the set temperature. In this case the regulating device controls the second trim valve 26 in such a way that the temperature of the air in the first zone feed line 24 is increased to approximately the set temperature $Tzf1_{set}$.

If the set temperature $Tzf1_{set}$ of the air in the first zone feed line 24 is lower than the set temperature $Tzf2_{set}$ of the air in the second zone feed line 18, then the regulating device controls the first trim valve 12 in such a way that the actual temperature $T2_{act.}$ of the air in the second line 14 corresponds approximately to the set temperature $Tzf1_{set}$ of the air in the first zone feed line 24. In this case the heating device 20 heats the air in the second feed line 18 to the set temperature $Tzf2_{set}$. The second trim valve 26 remains in this case substantially closed, since no or only very small amounts of warm air have to be fed to the first feed line 24.

If the set temperature $Tzf1_{set}$ of the air in the first zone feed line 24 is higher than the set temperature $Tzf2_{set}$ of the air in the second zone feed line 18, then the regulating device controls the first trim valve 14 in such a way that the actual temperature $T2_{act.}$ of the air in the second line is increased, and controls the heating device 20 in such a way that the heating device 20 heats the air in the second zone feed line 18 to the set temperature $Tzf2_{set}$. This control is necessary if the warm air fed via the first trim valve 12 to the second line 14 is not sufficient to increase the actual temperature $T2_{act.}$ of the air in the second line to the set temperature $Tzf2_{set}$ of the air in the second zone feed line 18. The second trim valve 26 is opened in order to heat the air in the first zone feed line 24 to the set temperature $Tzf1_{set}$.

If the set temperature $Tzf1_{set}$ of the air in the first zone feed line is lower than the set temperature $Tzf2_{set}$ of the air in the second zone feed line 18, then the regulating device controls the first trim valve 12 in such a way that the actual temperature $T2_{act.}$ of the air in the second line 14 is increased, and controls the second trim valve 26 in such a way that the air in the first zone feed line 24 is heated to the set temperature $Tzf1_{set}$. This control is necessary if the warm air fed via the first trim valve 12 is not sufficient to increase the actual temperature $T2_{act.}$ of the air in the second line 14 to the set temperature $Tzf1_{set}$ of the air in the first zone feed line 24. The heating device 20 heats the air flowing into the second zone 4 to the set temperature $Tzf2_{set}$. The heating device 20 may be dimensioned relatively small since it receives air that has already been preheated.

Since the first trim valve 12 heats the air in the second line 14, an icing of the second line 14, of the first zone feed line 24 and/or of the second zone feed line 18 is effectively prevented. The second line 14, the first zone feed line 24 and the second zone feed line 18 are particularly susceptible to icing-up since they contain a large number of bends so that they can be adapted to the respective existing spatial conditions. In addition the invention achieves a redundant air conditioning of the cabin. Even if the first trim valve, the second trim valve or the heating device fail, the first zone and/or the second zone can still be (almost) completely air-conditioned.

The invention claimed is:

1. An aircraft air-conditioning system (1) for an aircraft containing a plurality of zones (2, 4), comprising
    a cold air source,
    a first line (6) for feeding cold, non-recirculated air at an actual temperature $T1_{act.}$, wherein the first line (6) is fed from the cold air source and the first line (6), downstream and/or upstream of a branching point (10) at which air is tapped off for a plurality of zones (2, 4), feeds cold air at least to one further region that is provided for passengers and/or freight,
    a second line (14) which branches off a portion of the air from the first line (6) at the branching point (10) and feeds this air to the plurality of zones (2, 4) of the aircraft, wherein warm air is fed into the second line (14) through a first trim valve (12) so that the air in the second line (14) is heated to the actual temperature $T2_{act}$ higher than about 0° C., and
    a first zone feed line (24) feeding the air downstream of the first trim valve (12) to a first zone (2),
    wherein in the first zone feed line (24) a second trim valve (26) is arranged, through which warm air is fed into the first zone feed line (24) so that the air in the first zone feed line (24) is heated to the actual temperature $Tzf1_{act.}$,
    characterised in that the first line (6) feeds air to a mixing chamber, to which is also fed recirculated air.

2. The aircraft air-conditioning system (1) according to claim 1, characterised in that the cold air source is an air-conditioning PACK.

3. The aircraft air-conditioning system (1) according to claim 1,
    characterised in that the temperature of the air in the first line (6) is between about −10° C. and about 0° C.

4. The aircraft air-conditioning system (1) according to claim 1,
    characterised in that a second zone feed line (18) feeds air downstream of the first trim valve (12) to a second zone (4).

5. The aircraft air-conditioning system (1) according to claim 1,
    characterised in that a heating device (20) is arranged in the second zone feed line (18), which heats up the air in the second zone feed line (18) to the actual temperature $Tzf2_{act.}$.

6. The aircraft air-conditioning system (1) according to claim 4,
    characterised in that the second zone (4) requires a smaller amount of warm air than the first zone (2).

7. The aircraft air-conditioning system (1) according to claim 1,
    characterised in that the aircraft air-conditioning system (1) furthermore includes a temperature sensor (16), which senses the actual temperature $T2_{act.}$ of the air in the second line (14) downstream of the first trim valve (12), and includes a regulating device which is adapted to control the first trim valve (12) and the second trim valve (26).

8. The aircraft air-conditioning system (1) according to claim 7,
characterised in that the regulating device controls the first trim valve (12) in such a way that the actual temperature $T2_{act.}$ of the air in the second line (14) corresponds approximately to the set temperature $Tzf2_{set}$ of the air in the second zone feed line (18).

9. The aircraft air-conditioning system (1) according to claim 7,
characterised in that the aircraft air-conditioning system (1) furthermore includes a first zone feed line temperature sensor (28), which senses the actual temperature $Tzf1_{act.}$ of the air in the first zone feed line (24) downstream of the trim valve (26), and includes a second zone feed line temperature sensor (22), which senses the actual temperature $Tzf2_{act.}$ of the air in the second zone feed line (18) downstream of the heating device (20).

10. The aircraft air-conditioning system (1) according to claim 7,
characterised in that if the set temperature $Tzf1_{set}$ of the air in the first zone feed line (24) is higher than the set temperature $Tzf2_{set}$ of the air in the second zone feed line (18), then the regulating device controls the first trim valve (12) in such a way that the actual temperature $T2_{act.}$ of the air in the second line (14) corresponds approximately to the set temperature $Tzf2_{set}$ of the air in the second zone feed line (18).

11. The aircraft air-conditioning system (1) according to claim 7,
characterised in that if the set temperature $Tzf1_{set}$ of the air in the first zone feed line (24) is lower than the set temperature $Tzf2_{set}$ of the air in the second zone feed line (18), then the regulating device controls the first trim valve (12) in such a way that the actual temperature $T2_{act.}$ of the air in the second line (14) corresponds approximately to the set temperature $Tzf1_{set}$ of the air in the first zone feed line (24).

12. The aircraft air-conditioning system (1) according to claim 7,
characterised in that if the set temperature $Tzf1_{set}$ of the air in the first zone feed line (24) is higher than the set temperature $Tzf2_{set}$ of the air in the second zone feed line (18), then the regulating device controls the first trim valve (12) in such a way that the actual temperature $T2_{act.}$ of the air in the second line (14) is increased, and controls the heating device (20) in such a way that the heating device (20) heats the air in the second zone feed line (18) to the set temperature $Tzf2_{set}$.

13. The aircraft air-conditioning system (1) according to claim 7,
characterised in that if the set temperature $Tzf1_{set}$ of the air in the first zone feed line (24) is lower than the set temperature $Tzf2_{set}$ of the air in the second zone feed line (18), then the regulating device controls the first trim valve (12) in such a way that the actual temperature $T2_{act.}$ of the air in the second line (14) is increased, and controls the second trim valve (26) in such a way that the air in the first zone feed line (24) is heated to the set temperature $Tzf1_{set}$.

14. The aircraft air-conditioning system (1) according to claim 7,
characterised in that the aircraft air-conditioning system (1) includes a first zone temperature sensor (32), which senses the actual temperature $Tz1_{act.}$ of the air in the first zone (2), wherein the regulating device determines the set temperature $Tzf1_{set}$ of the air in the first feed line (24) from the actual temperature $Tz1_{act.}$ and from the set temperature $Tz1_{set}$ of the air in the first zone (2).

15. The aircraft air-conditioning system (1) according to claim 7,
characterised in that the aircraft air-conditioning system (1) includes a second zone temperature sensor (30), which senses the actual temperature $Tz2_{act.}$ of the air in the second zone (4), wherein the regulating device determines the set temperature $Tzf2_{set}$ of the air in the second feed line (18) from the actual temperature $Tz2_{act.}$ and from the set temperature $Tz2_{set}$ of the air in the second zone (4).

16. A method for the air conditioning of a plurality of zones (2, 4) in an aircraft, comprising the following steps:
providing an aircraft air conditioning system according to claim 1;
feeding non-recirculated cold air at an actual temperature $T1_{act.}$ in a first line (6);
branching off part of the cold air into a second line (14) at a branching point (10);
passing the cold air in the first line (6) to further zones, which are located downstream and/or upstream of the branching point (10);
feeding warm air via a first trim valve (12) to the second line (14), so that the air in the second line (14) is heated to an actual temperature $T2_{act.}$ that is higher than 0° C.;
passing a part of the air in the second line (14) through a first zone feed line (24) into a first zone (2); and
feeding warm air through a second trim valve (26) into the first zone feed line (24), so that the air in the first zone feed line (24) is heated to the actual temperature $Tzf1_{act.}$,
characterised by supplying air by the first line to a mixing chamber, to which is also fed recirculated air.

17. The method according to claim 16, characterised by the following steps:
leading part of the air in the second line (14) through a second zone feed line (18) into a second zone (4); and
heating the air in the second zone feed line (18) to the actual temperature $Tzf2_{act.}$ with a heating device (20).

18. The aircraft air-conditioning system (1) according to claim 2,
characterised in that a second zone feed line (18) feeds air downstream of the first trim valve (12) to a second zone (4).

19. The aircraft air-conditioning system (1) according to claim 2,
characterised in that a heating device (20) is arranged in the second zone feed line (18), which heats up the air in the second zone feed line (18) to the actual temperature $Tzf2_{act.}$.

20. The aircraft air-conditioning system (1) according to claim 2,
characterised in that the aircraft air-conditioning system (1) furthermore includes a temperature sensor (16), which senses the actual temperature $T2_{act.}$ of the air in the second line (14) downstream of the first trim valve (12), and includes a regulating device which is adapted to control the first trim valve (12) and the second trim valve (26).

* * * * *